US006929417B2

United States Patent
Boudreau (10) Patent No.: US 6,929,417 B2
(45) Date of Patent: Aug. 16, 2005

(54) METHODS AND APPARATUS FOR SENSING A PAPER LOW CONDITION FOR FAN-FOLDED TICKETS IN A TICKET PRINTER

(75) Inventor: David Boudreau, Ithaca, NY (US)

(73) Assignee: TransAct Technologies Incorporated, Wallingford, CT (US)

(*) Notice: Subject to any disclaimer, the term of this patent is extended or adjusted under 35 U.S.C. 154(b) by 0 days.

(21) Appl. No.: 10/878,734

(22) Filed: Jun. 28, 2004

(65) Prior Publication Data

US 2005/0100384 A1 May 12, 2005

Related U.S. Application Data

(60) Provisional application No. 60/519,521, filed on Nov. 12, 2003.

(51) Int. Cl.[7] ............................................. B41J 29/18
(52) U.S. Cl. ..................... 400/703; 400/706; 399/23; 358/1.14; 358/1.15
(58) Field of Search .................. 400/703, 662, 400/706, 656, 642; 101/288; 271/111, 154; 340/540; 250/556; 358/1.14, 1.15; 347/104; 399/23

(56) References Cited

U.S. PATENT DOCUMENTS

| | | | | |
|---|---|---|---|---|
| 4,292,529 A | * | 9/1981 | Thurston ................ 250/559.36 |
| 4,698,650 A | * | 10/1987 | Watanabe et al. ............ 346/134 |
| 4,748,479 A | * | 5/1988 | Ohira et al. .................... 355/72 |
| 4,835,573 A | * | 5/1989 | Rohrer et al. .................. 399/23 |
| 4,885,613 A | * | 12/1989 | Kudoh ......................... 399/23 |
| 4,929,949 A | * | 5/1990 | Yamamoto et al. .......... 341/176 |
| 5,019,840 A | * | 5/1991 | Watanabe et al. ............ 346/134 |
| 5,096,180 A | * | 3/1992 | Nagaoka et al. ............. 271/110 |
| 5,291,028 A | * | 3/1994 | Droge et al. ................. 250/568 |
| 5,308,992 A | * | 5/1994 | Crane et al. ................. 250/556 |
| 5,434,427 A | * | 7/1995 | Crane et al. ................. 250/556 |
| 5,618,120 A | * | 4/1997 | Ishikawa ..................... 400/708 |
| 5,629,672 A | * | 5/1997 | Brown et al. ................ 340/540 |
| 5,673,907 A | * | 10/1997 | Rumsey et al. ............. 271/9.13 |
| 5,700,003 A | * | 12/1997 | Sung .......................... 271/110 |
| 5,727,890 A | * | 3/1998 | Stodder et al. .............. 400/624 |
| 5,960,230 A | * | 9/1999 | Peter ........................... 399/23 |
| 6,100,993 A | * | 8/2000 | Eom .......................... 358/1.14 |
| 6,140,662 A | * | 10/2000 | Lim et al. ................ 250/559.38 |
| 6,599,041 B1 | * | 7/2003 | Ahne et al. ................. 400/582 |
| 6,625,561 B1 | * | 9/2003 | Tullis .......................... 702/128 |
| 6,629,796 B2 | * | 10/2003 | Kawakami et al. .......... 400/582 |
| 6,661,979 B2 | * | 12/2003 | Barlow ......................... 399/23 |
| 6,804,474 B2 | * | 10/2004 | Morita et al. ................. 399/23 |
| 2004/0183850 A1 | * | 9/2004 | Takeuchi et al. .............. 347/19 |

FOREIGN PATENT DOCUMENTS

JP 09-067044 * 3/1977 ............ B65H/7/04

* cited by examiner

Primary Examiner—Andrew H. Hirshfeld
Assistant Examiner—Wasseem H. Hamdan
(74) Attorney, Agent, or Firm—Lipsitz & McAllister, LLC (57) ABSTRACT

Methods and apparatus are provided for sensing a paper low condition for fan-folded tickets in a ticket printer. An aperture is provided in a bottom portion of a paper tray which supports a stack of fan-folded tickets. The aperture may be positioned underneath an end of the ticket stack. A reflective sensor is positioned underneath the aperture. Light from the reflective sensor is reflected off a bottom ticket of the ticket stack and back to the sensor when the bottom ticket covers the aperture, indicating the presence of the tickets in the paper tray. A paper low condition may be sensed when enough tickets are printed such that the end of the ticket stack is lifted off the bottom portion of the paper tray and away from the aperture such that light is not reflected back to the sensor.

16 Claims, 8 Drawing Sheets

METHODS AND APPARATUS FOR SENSING A PAPER LOW CONDITION FOR FAN-FOLDED TICKETS IN A TICKET PRINTER

This application claims the benefit of U.S. provisional patent application No. 60/519,521 filed on Nov. 12, 2003, entitled "Smart Printer Including Configurable Ticket Template, Status Updating, Color Conversion, Print Progress Detection, Print Completion Detection, and Paper Low Sensing Features," which is incorporated herein and made a part hereof by reference.

BACKGROUND OF THE INVENTION

The present invention relates generally to the field of printing. More specifically, the present invention provides methods and apparatus for sensing a paper low condition for fan-folded tickets in a ticket printer.

Figure 1:
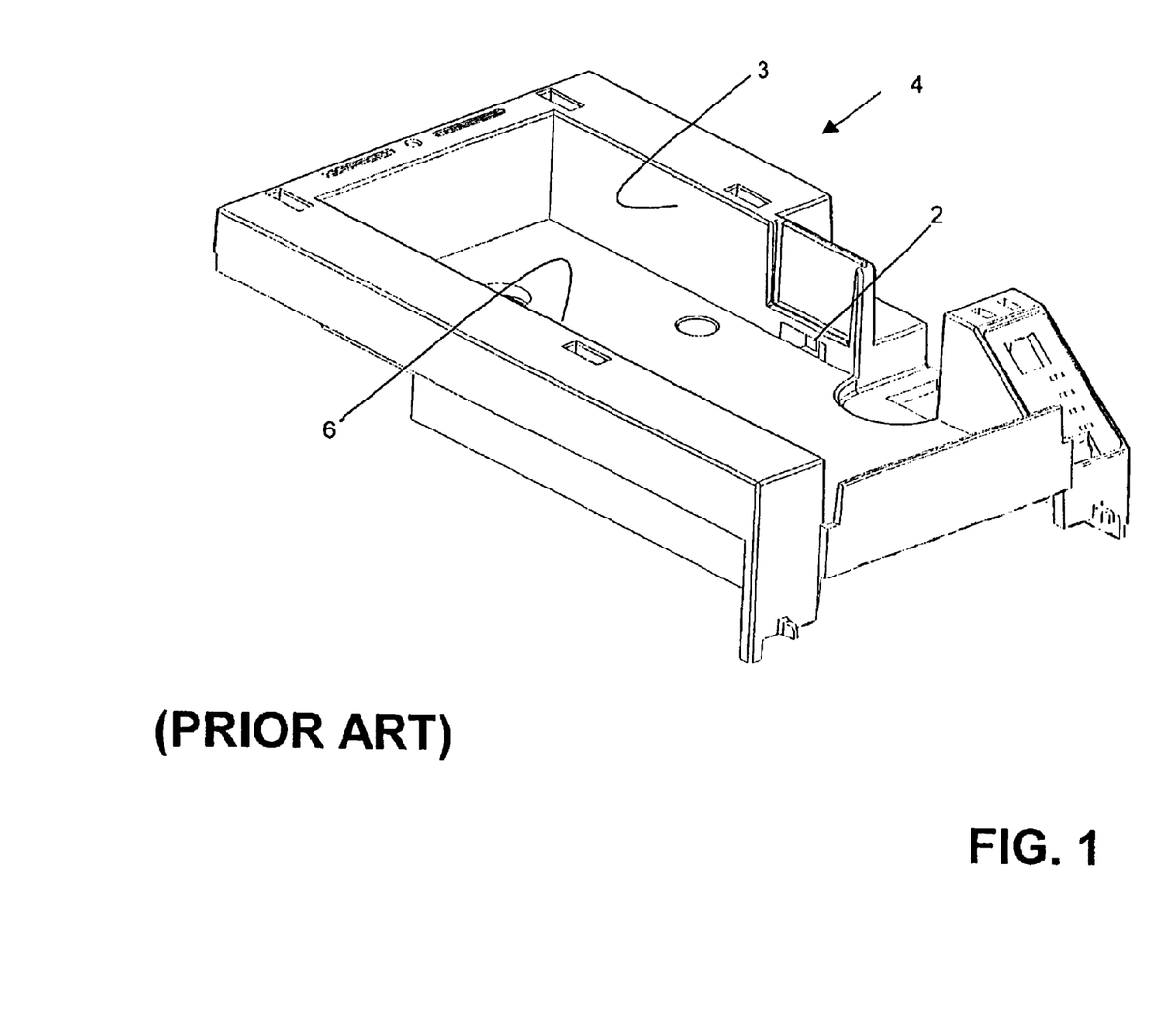
FIG. 1 shows an example prior art implementation of a paper low sensor for a ticket printer.

In an example of the prior art as shown in FIG. 1, a reflective sensor 2 is mounted to the side 3 of a paper tray 4 which can hold a stack of fan-folded tickets. A light emitting diode (LED) of the reflective sensor 2 shines light onto the side of the stack of tickets. If the light from the LED reflects off of the ticket stack, then that light will return to a phototransistor inside the reflective sensor 2. In this case, the printer will not report a paper low condition. If the light from the LED does not reflect off of the ticket stack, then that light will not return to the phototransistor inside the reflective sensor. In this case, the printer will report a paper low condition.

One problem with this method of sensing a paper low condition is that the printer will typically report a paper low condition when there are twenty to forty tickets left in the paper tray 4. The critical specification for a reflective object sensor is the distance between the sensor and the object to be sensed. The paper tray 4 is wider than the tickets in order to accommodate the ticket width tolerance. Therefore, if the tickets are biased towards the paper tray side 6 that is furthest away from the sensor 2, then the distance from the sensor 2 to the tickets will be, for example, approximately 0.08 inches greater than if the tickets were biased towards the paper tray side 3 that is closest to the sensor 2. This complicates the sensor design and could lead to paper low sensing failures.

Further, reflective object sensors are not designed to sense small objects. The typical ticket thickness is approximately 0.005 inches. When the sensor 2 is mounted to the side 3 of the paper tray 4, it cannot accurately sense how many tickets are left in the paper tray. One sensor may indicate that paper is low when there are 30–40 tickets left in the paper tray. Another sensor may indicate that paper is low when there are 10–20 tickets left in the paper tray. Therefore, if the operator puts a new stack of fan-folded tickets into the paper tray after receiving the paper low message, the operator will end up discarding a large number of unused tickets. Such an implementation is wasteful of resources.

It would be advantageous to provide methods and apparatus for sensing a paper low condition for fan-folded tickets in a ticket printer which indicates a paper low condition when only one or two tickets remain in the ticket printer, to avoid wasting unused tickets.

The methods and apparatus of the present invention provide the foregoing and other advantages.

SUMMARY OF THE INVENTION

The present invention provides methods and apparatus for sensing a paper low condition for fan-folded tickets in a ticket printer. In an example embodiment of the present invention, an aperture is provided in a bottom portion of a paper tray which supports a stack of fan-folded tickets. The aperture may be positioned at one end of the paper tray underneath an end of the stack of fan-folded tickets. A reflective sensor is positioned underneath the aperture such that light from the reflective sensor is reflected off of a bottom ticket of the stack of fan-folded tickets and back to the reflective sensor when the bottom ticket is covering the aperture, indicating the presence of the fan-folded tickets in the paper tray. A paper low condition may be sensed when enough tickets are printed such that the end of the ticket stack is lifted off the bottom portion of the paper tray and away from the aperture so that the light is not reflected back to the reflective sensor.

The end of the ticket stack may be lifted off of the bottom portion of the paper tray and away from the aperture when two tickets are left in the paper tray. Alternatively, the end of the ticket stack may be lifted off of the bottom portion of the paper tray and away from the aperture when one ticket is left in the paper tray.

The reflective sensor may comprise a light source and a light sensor. The light source may comprise a light emitting diode (LED). The light sensor may comprise a phototransistor.

An indicator may be provided on the printer to indicate when a paper low condition is sensed. A sensed paper low condition may be reported to a host device associated with the printer. An indicator may be provided on the host device to indicate the reported paper low condition.

The ticket printer may comprise a slot machine ticket printer, a gaming machine ticket printer, a point of sale ticket printer, a lottery machine ticket printer, a ticket printer for a transportation ticket vending machine, a ticket printer for an entertainment ticket vending machine, or virtually any type of printer that uses fan-folded paper.

Corresponding methods and apparatus are provided in accordance with the invention.

BRIEF DESCRIPTION OF THE DRAWINGS

The present invention will hereinafter be described in conjunction with the appended drawing figures, wherein like numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an example embodiment of the invention. It should be understood that various changes may be made in the function and arrangement of elements without departing from the spirit and scope of the invention as set forth in the appended claims.

Figure 2:
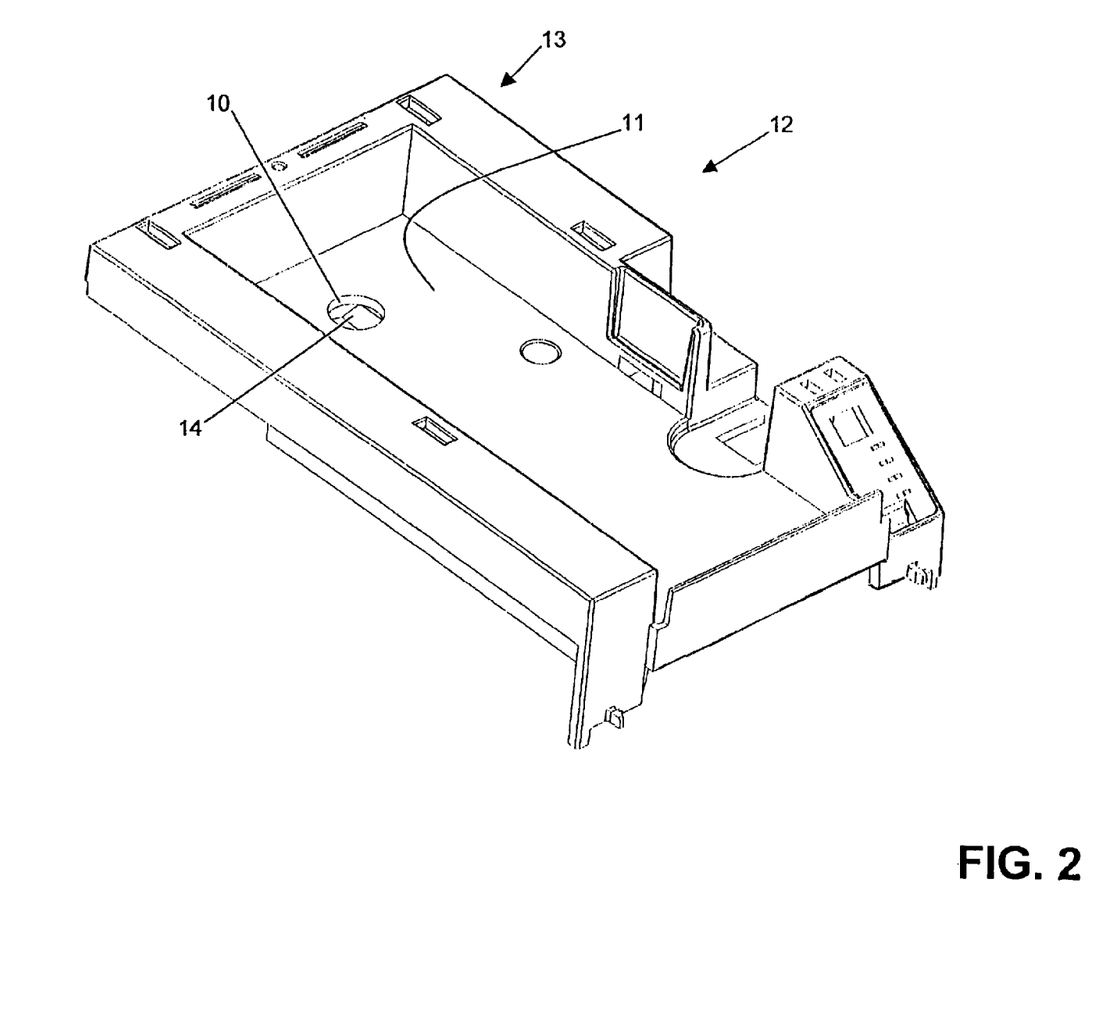
FIG. 2 shows a top view of a paper tray with a reflective sensor in accordance with the present invention.
Figure 3:
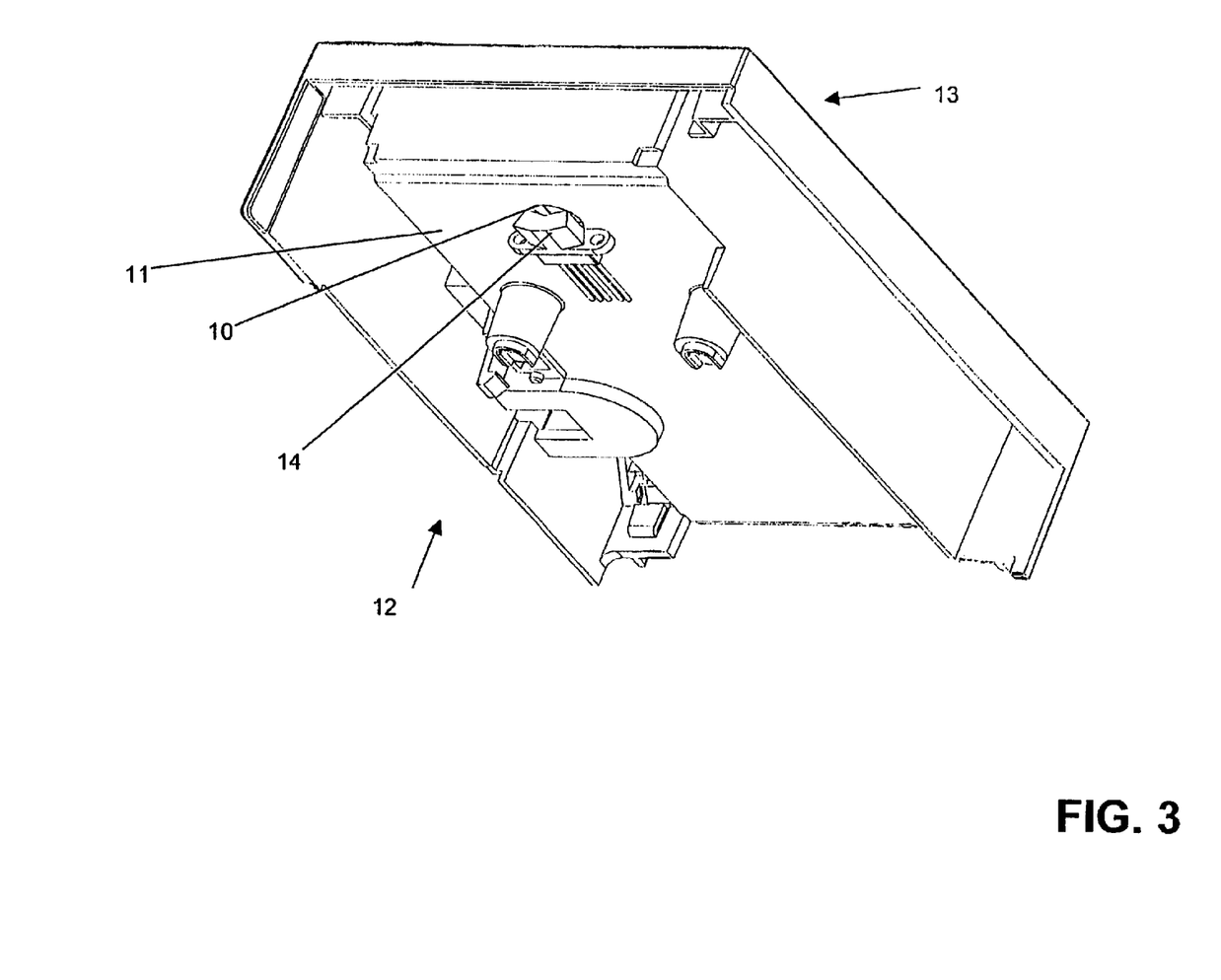
FIG. 3 shows a bottom view of a paper tray with a reflective sensor in accordance with the present invention.

The present invention provides methods and apparatus for sensing a paper low condition for fan-folded tickets in a ticket printer as shown in FIGS. 2 and 3. FIG. 2 is a top view of a paper tray 12 and FIG. 3 is a bottom view of the same paper tray 12. In an example embodiment of the present invention, an aperture 10 is provided in a bottom portion 11 of a paper tray 12 which supports a stack of fan-folded tickets. The stack of fan-folded tickets is not shown in FIGS. 2 and 3, as the stack of tickets would hide the aperture 10 and from view. The aperture 10 may be positioned at one end 13 of the paper tray 12 underneath an end of the stack of fan-folded tickets. A reflective sensor 14 is positioned underneath the aperture 10 such that light from the reflective sensor is reflected off of a bottom ticket of the stack of fan-folded tickets and back to the reflective sensor 14 when the bottom ticket is covering the aperture 10, indicating the presence of the fan-folded tickets in the paper tray. A paper low condition may be sensed when enough tickets are printed such that the end of the ticket stack is lifted off the bottom portion 11 of the paper tray 12 and away from the aperture 10 such that the light is not reflected back to the reflective sensor 14.

Figure 4:
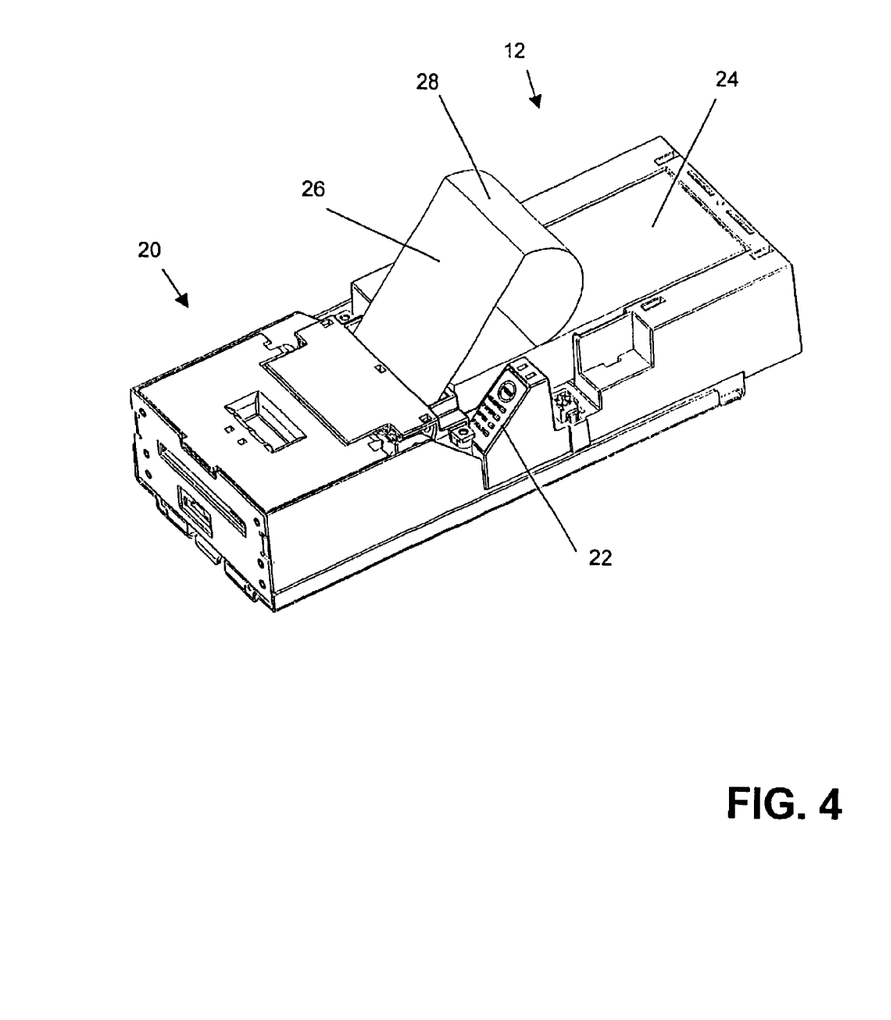
FIG. 4 shows an example embodiment wherein the paper tray of FIGS. 2 and 3 is connected to a printer and has a full stack of tickets.

FIGS. 4–7 show the example embodiment of the paper tray 12 of FIGS. 2 and 3 connected to a ticket printer 20. FIG. 4 shows a full stack of tickets 24 in the paper tray 12, with one ticket 26 being fed into the printer 20. In FIG. 4, the aperture 10 shown in FIGS. 1–3 is completely covered by the ticket stack 24. Therefore, light from the reflective sensor 14 will reflect off the bottom of the ticket stack 24 and back to the sensor 14, thereby indicating the presence of tickets 24 in the paper tray 12. As printing progresses, consecutive tickets 26, 28 will be fed into the printer 20, thereby diminishing the stack of tickets 24 in the paper tray 12.

Figure 5:
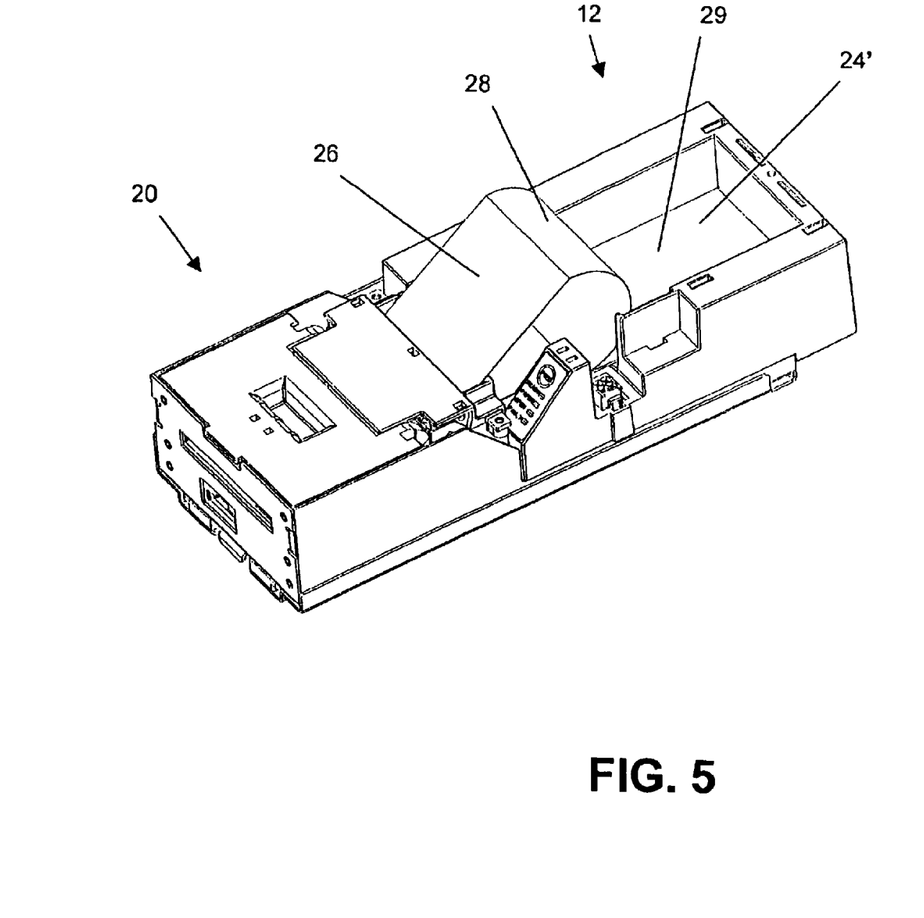
FIG. 5 shows the paper tray of FIG. 4 with only three tickets remaining.

FIG. 5 shows an almost empty paper tray 12 with only three tickets left in a diminishing stack of tickets 24'. One ticket 26 is being fed into the printer 20, which in turn draws up the next ticket 28 off of the diminishing stack of tickets 24'. In FIG. 5, the aperture 10 is still covered by the last ticket 29 in the diminishing stack of tickets 24', so the sensor 14 will continue to sense the presence of tickets in the paper tray 12.

Figure 6:
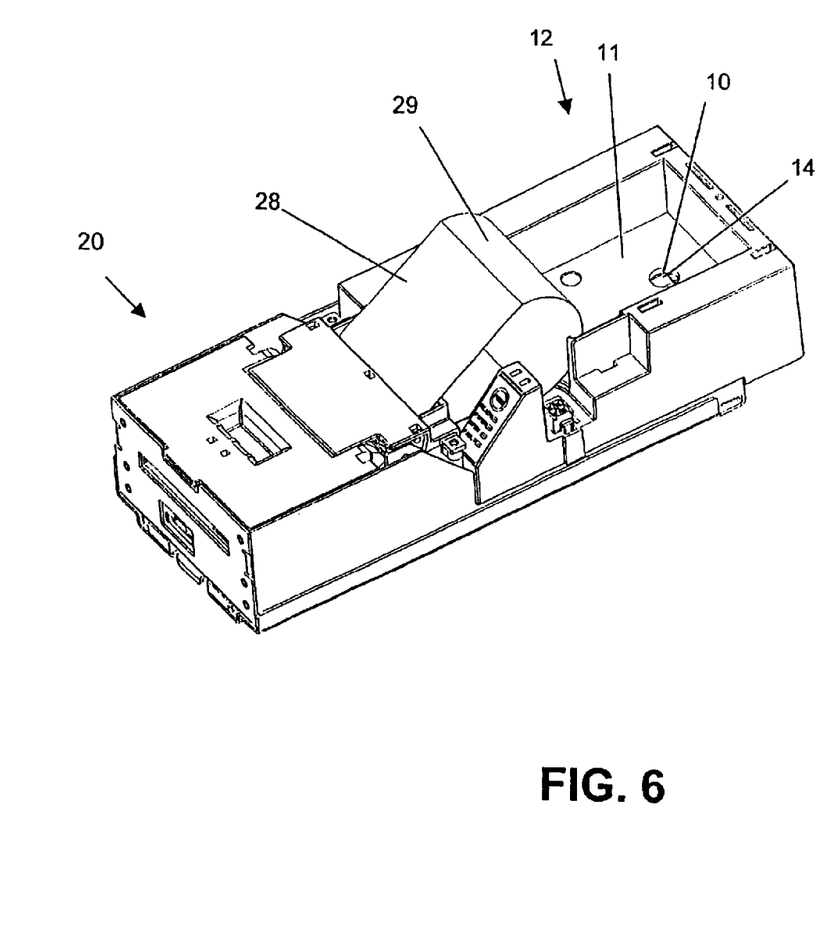
FIG. 6 shows the paper tray of FIG. 4 with only two tickets remaining.

FIG. 6 shows only two tickets 28 and 29 left in the paper tray 12. As ticket 28 is fed into the printer, the last ticket 29 is drawn off of the bottom portion 11 of the paper tray 12, exposing the aperture 10 and the sensor 14. As the bottom ticket 29 no longer covers the aperture 10, light from the sensor 14 will not be reflected back to the sensor 14. Therefore, the sensor 14 will now indicate a paper low condition.

Figure 7:
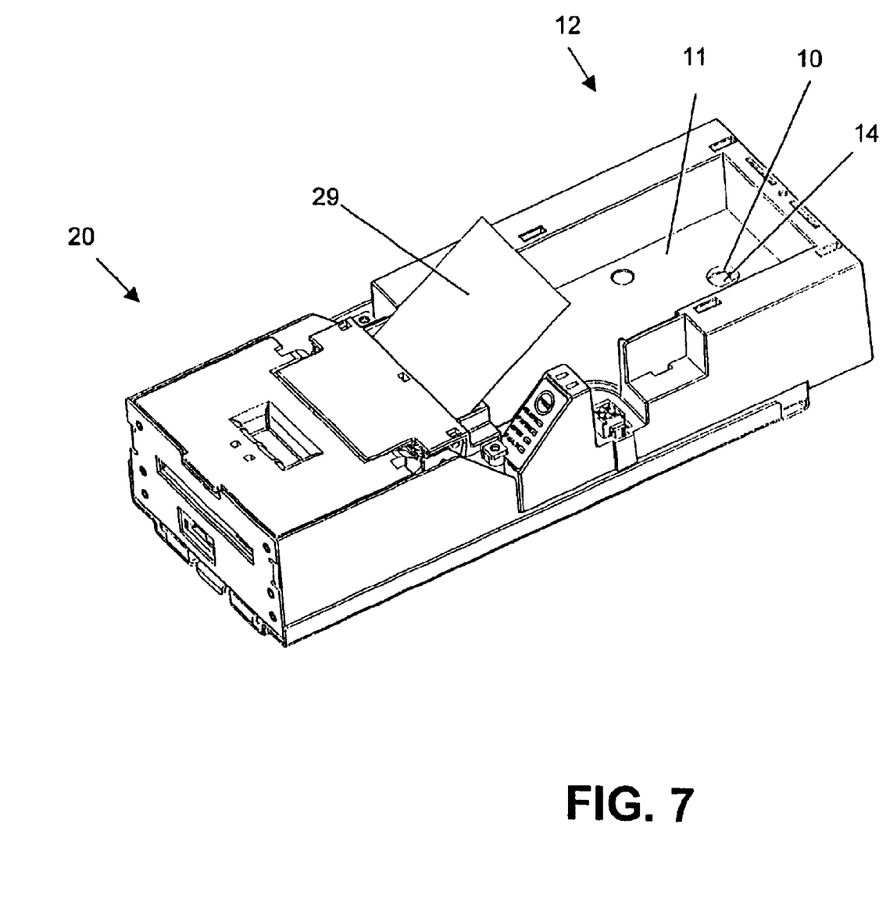
FIG. 7 shows the paper tray of FIG. 4 with only one ticket remaining.

FIG. 7 shows the last ticket 29 being drawn into the printer 22, resulting in exposure of the aperture 10 and the sensing of a paper low condition by the sensor 14 as described above in connection with FIG. 6.

The ticket printer 20 may be connected to or part of a host device (not shown) such as a slot machine, a gaming machine, a cash register, a lottery machine, a transportation ticket vending machine, an entertainment ticket vending machine, or virtually any type of device that generates tickets. An indicator 22 (FIG. 4) may be provided on the printer or paper tray 12 to indicate when a paper low condition is sensed. A sensed paper low condition may be reported to a host device associated with the printer 20. A similar indicator may also be provided on the host device to indicate the reported paper low condition.

The ticket printer 20 may comprise a slot machine ticket printer, a gaming machine ticket printer, a point of sale ticket printer, a lottery machine ticket printer, a ticket printer for a transportation ticket vending machine, a ticket printer for an entertainment ticket vending machine, or virtually any type of printer that uses fan-folded paper.

Figure 8:
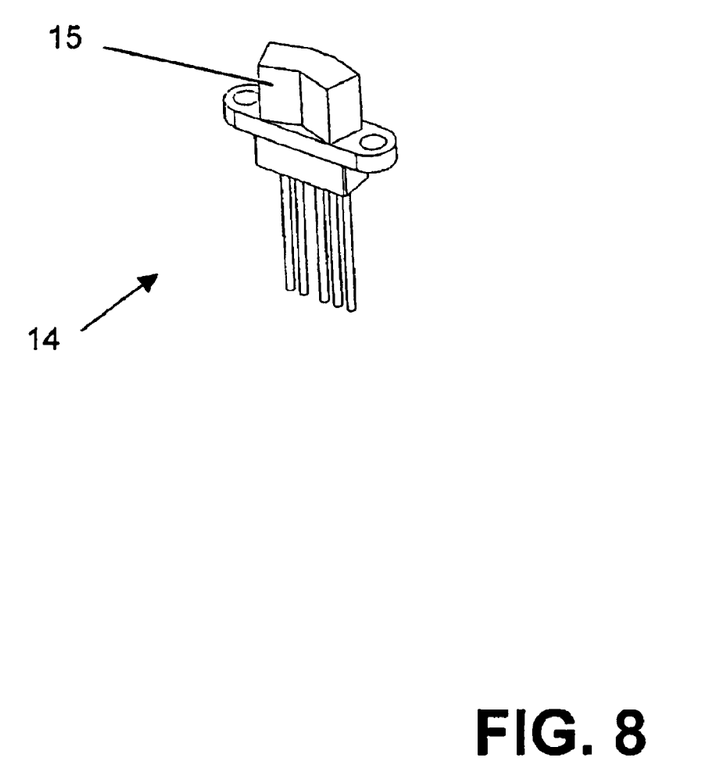
FIG. 8 shows an example embodiment of a reflective sensor in accordance with the present invention.

An example embodiment of a reflective sensor 14 in accordance with the present invention is shown in FIG. 8. The reflective sensor 14 may comprise a light source and a light sensor. Typical reflective object sensors have the light source and the sensor mounted side by side in an opaque housing 15. The light source may comprise a light emitting diode (LED). The light sensor may comprise a phototransistor. Examples of reflective object sensors which may be used with the present invention include reflective object sensors made by OPTEK Technology Inc., of Carrollton, Tex., such as, for example, the type OPB755T, type OPB608A/B/C, type OPB 608R, and type OPB608V reflective object sensors. Many other off-the-shelf reflective object sensors are also suitable for use with the present invention, as will be apparent to those skilled in the art.

It should now be appreciated that the present invention provides advantageous methods and apparatus for sensing a paper low condition for fan-folded tickets in a ticket printer.

Although the invention has been described in connection with various illustrated embodiments, numerous modifications and adaptations may be made thereto without departing from the spirit and scope of the invention as set forth in the claims.

What is claimed is:

1. A method for sensing a paper low condition for fan-folded tickets in a ticket printer, comprising:

providing an aperture in a bottom portion of a paper tray which supports a stack of fan-folded tickets, the aperture being positioned at one end of said paper tray underneath an end of said stack of fan-folded tickets;

positioning a reflective sensor underneath the aperture such that light from the reflective sensor passes through the aperture and is reflected off of a bottom ticket of said stack of fan-folded tickets and back to said reflective sensor when said bottom ticket is covering said aperture, indicating the presence of said fan-folded tickets; and sensing a paper low condition when enough tickets are printed such that the end of said ticket stack is lifted off the bottom portion of the paper tray and away from the aperture such that said light is not reflected back to said reflective sensor; wherein the end of said ticket stack is lifted off of the bottom portion of the paper tray and away from the aperture when either one or two tickets are left in said paper tray.

2. A method in accordance with claim 1, wherein:

said reflective sensor comprises a light source and a light sensor.

3. A method in accordance with claim 2, wherein:

said light source comprises a light emitting diode.

4. A method in accordance with claim 2, wherein:

said light sensor comprises a phototransistor.

5. A method in accordance with claim 1, further comprising:
providing an indicator on said printer to indicate when a paper low condition is sensed.

6. A method in accordance with claim 1, further comprising:
reporting a sensed paper low condition to a host device associated with said printer.

7. A method in accordance with claim 6, further comprising:
providing an indicator on said host device to indicate the reported paper low condition.

8. A method in accordance with claim 1, wherein:
said ticket printer comprises one of a slot machine ticket printer, a gaming machine ticket printer, a point of sale ticket printer, a lottery machine ticket printer, a ticket printer for a transportation ticket vending machine, or a ticket printer for an entertainment ticket vending machine.

9. Apparatus for sensing a paper low condition for fan-folded tickets in a ticket printer, comprising:
an aperture in a bottom portion of a paper tray which supports a stack of fan-folded tickets, the aperture being positioned at one end of said paper tray underneath an end of said stack of fan-folded tickets; and
a reflective sensor positioned underneath the aperture such that light from the reflective sensor passes through the aperture and is reflected off of a bottom ticket of said stack of fan-folded tickets and back to said reflective sensor when said bottom ticket is covering said aperture, indicating the presence of said fan-folded tickets;
wherein said reflective sensor senses a paper low condition when enough tickets are printed such that the end of said ticket stack is lifted off the bottom portion of the paper tray and away from the aperture such that said light is not reflected back to said reflective sensor; and the end of said ticket stack is lifted off of the bottom portion of the paper tray and away from the aperture when either one or two tickets are left in said paper tray.

10. Apparatus in accordance with claim 9, wherein:
said reflective sensor comprises a light source and a light sensor.

11. Apparatus in accordance with claim 10, wherein:
said light source comprises a light emitting diode.

12. Apparatus in accordance with claim 10, wherein:
said light sensor comprises a phototransistor.

13. Apparatus in accordance with claim 9, further comprising:
an indicator on said printer to indicate when a paper low condition is sensed.

14. Apparatus in accordance with claim 9, wherein:
a sensed paper low condition is reported to a host device associated with said printer.

15. Apparatus in accordance with claim 14, further comprising:
an indicator on said host device to indicate the reported paper low condition.

16. Apparatus in accordance with claim 9, wherein:
said ticket printer comprises one of a slot machine ticket printer, a gaming machine ticket printer, a point of sale ticket printer, a lottery machine ticket printer, a ticket printer for a transportation ticket vending machine, or a ticket printer for an entertainment ticket vending machine.

* * * * *